(12) United States Patent
Weinreich (10) Patent No.: US 6,786,612 B2
(45) Date of Patent: Sep. 7, 2004

(54) TURNING MIRROR (76) Inventor: Stephen Weinreich, 14 Norton Rd., Monmouth Junction, NJ (US) 08852

(*) Notice: Subject to any disclaimer, the term of this patent is extended or adjusted under 35 U.S.C. 154(b) by 0 days.

(21) Appl. No.: 10/707,436

(22) Filed: Dec. 13, 2003

(65) Prior Publication Data
US 2004/0109246 A1 Jun. 10, 2004

Related U.S. Application Data

(62) Division of application No. 09/360,267, filed on Jul. 26, 1999, now abandoned.
(60) Provisional application No. 60/100,717, filed on Sep. 17, 1998.

(51) Int. Cl.[7] .............................................. G02B 7/182
(52) U.S. Cl. ..................... 359/871; 359/872; 359/879
(58) Field of Search ................................. 359/871–872, 359/879, 855–856, 220; 248/309.1; 358/248

(56) References Cited

U.S. PATENT DOCUMENTS

| | | |
|---|---|---|
| 1,334,810 A | 3/1920 | Smith .......................... 359/855 |
| 3,449,035 A | 6/1969 | Denaro |
| 4,154,507 A | 5/1979 | Barr ............................ 359/220 |
| 4,187,001 A | 2/1980 | Redwitz et al. .............. 359/872 |
| 5,173,781 A | 12/1992 | Masreliez .................... 358/248 |
| 5,392,521 A | 2/1995 | Allen ........................... 33/293 |
| 5,589,991 A | 12/1996 | Bleier ......................... 359/856 |

Primary Examiner—Mohammad Sikder
(74) Attorney, Agent, or Firm—Stanley H. Kremen (57) ABSTRACT

A mirror which the viewer's reflection rotates clockwise or counterclockwise along with the rotation of the mirror.

15 Claims, 5 Drawing Sheets

TURNING MIRROR

CROSS REFERENCE TO RELATED APPLICATIONS

This application is a division of and claims domestic priority to my U.S. Non-Provisional patent application Ser. No. 09/360,267 filed on Jul. 26, 1999, entitled TURNING MIRROR, now abandoned and incorporated herein by reference; and further claims domestic priority to my Provisional Patent Application No. 60/100,717 filed Sep. 17, 1998, also entitled TURNING MIRROR, also incorporated herein by reference. No new matter has been introduced into the present application.

SUMMARY OF INVENTION

The TURNING MIRROR is a mirror in which the reflection rotates with the mirror's frame. The Turning Mirror can be used as a toy and in displays and for other purposes.

As is well known in the art, two planar mirrors arranged in plan to form a right angle (i.e., joined at 90-degrees about a vertical axis) will produce a non-reversed (i.e., not "mirror image") mirror image. In such a mirror arrangement, one's left eye, e.g., will appear as the left eye of one's reflection. The mirrors are preferably first-surface to minimize the mirrors' junction and, therefore, to minimize any discontinuity at the centerline of the reflected image.

To further disguise any apparent centerline, the mirrors may be scored at regular (or irregular) intervals, parallel to the centerline.

If, however, such a mirror arrangement is rotated (such that the joint is no longer vertical), the reflected image will also be rotated. If, e.g., one looks at one's reflection in such a mirror arrangement and rotates the arrangement so that the joint becomes horizontal, one's reflection will be inverted.

For some uses it may be sufficient (and particularly economical) to simply join mirrors at 90-degrees along a horizontal line. The mirrors will invert the reflections of passersby.

For most uses it is preferred to rotatably mount the mirror assembly. The axis of rotation preferably passes perpendicularly through the center of the mirror joint, at 45-degrees from each mirror. Rotation is preferably manual, but may be motorized by ordinary means. A housing for the mirror assembly is preferred in order to disguise the special structure of the mirror and to protect it.

As was discussed above, as the mirror joint is rotated to horizontal, the reflection becomes inverted. It is therefore apparent that the reflection rotates twice as fast as the mirror assembly (or mirror assembly in housing) itself.

It is, however, preferred that the reflection appear to rotate along with the mirror assembly. The reflection thus seems to be "stuck" to the assembly. Without modifying the optical structure, this illusion can be created by rotatably mounting the mirror assembly within a preferred housing. The mirror assembly and housing are coupled so that the housing rotates twice as fast as the mirrors. The most visible elements, the reflection and housing, therefore rotate at the same rate, resulting in a compelling illusion.

DETAILED DESCRIPTION

Figure 1:
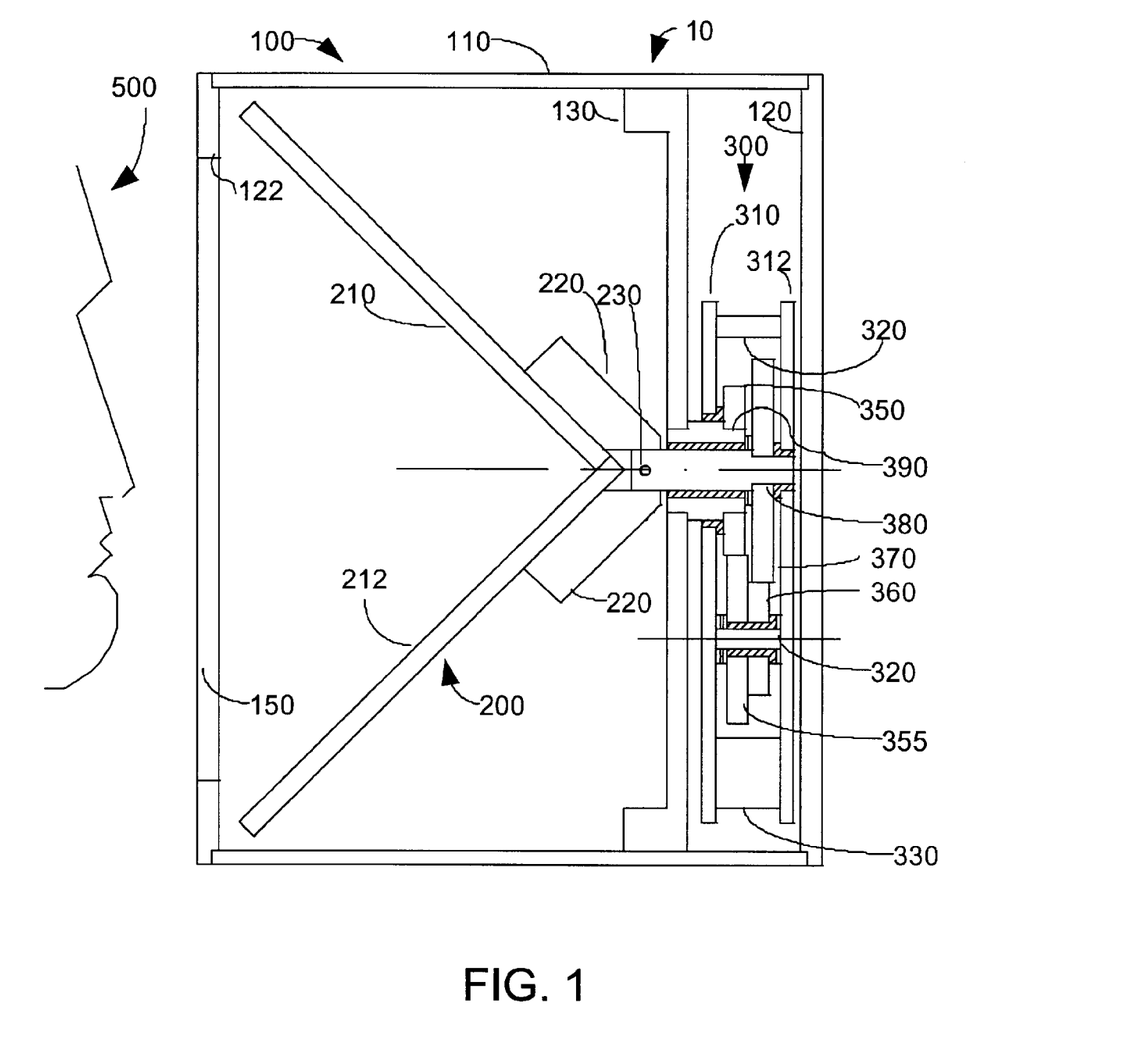
FIG. 1 is a side section through the center of a preferred embodiment of the Invention.
Figure 2:
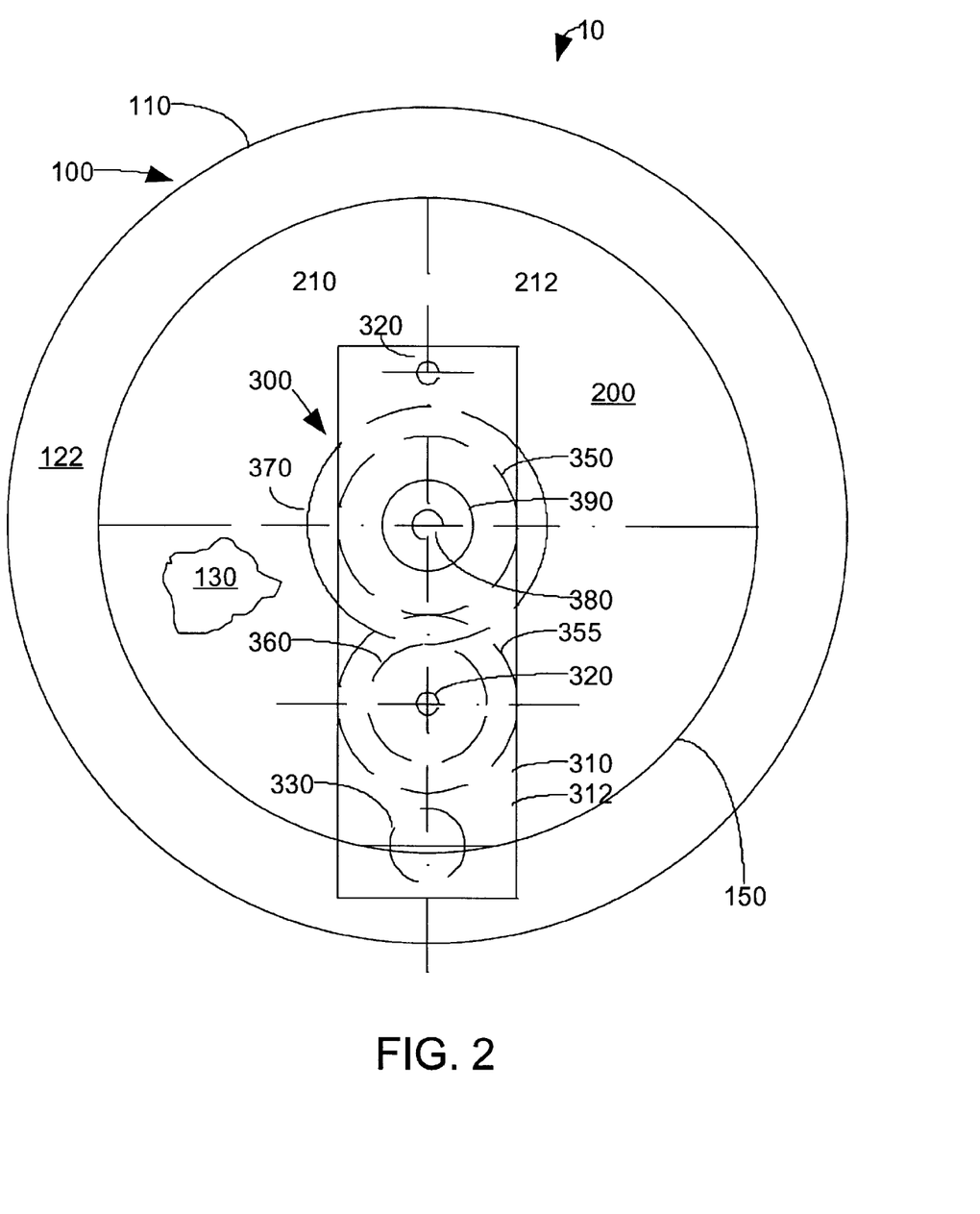
FIG. 2 is a front elevation of the preferred embodiment of FIG. 1.

Referring particularly to FIG. 1, with same numbers indicating same parts:

The preferred Turning Mirror apparatus 10 is comprised of a housing 100, a mirror assembly 200, and a gearbox 300.

Housing 100 is primarily a tube 110 which may be of any convenient material, preferably lightweight, economical, and durable, such as cardboard or suitable plastic. Back cover 120, also of any convenient material, such as wood or cardboard, is fitted to close one end of tube 110 and may be fastened in place. Front cover 122 is similar to back cover 120, but contains a window 150 through which mirror assembly 200 can be seen. The (maybe patterned) window is preferably covered with clear plastic, such as acrylic, to protect mirror assembly 200.

Flange 130, which can simply be a wood disc, is mounted to shaft 390 of gearbox 300 (as will be discussed below) and is fitted and connected, as by peripheral screws, to tube 110.

Figure 4A:
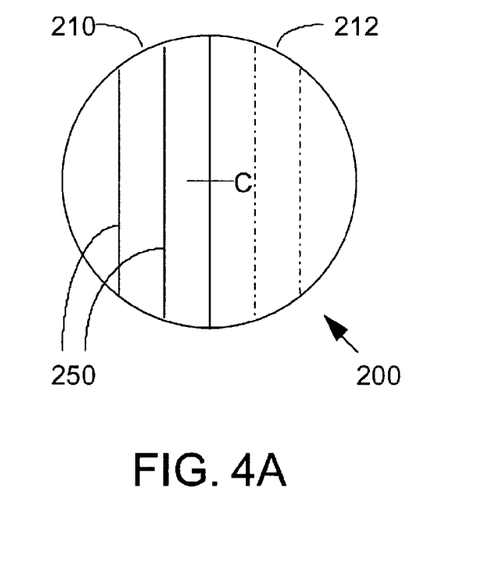
FIG. 4A is a front elevation of a preferred embodiment of the two mirrors of the Invention.
Figure 5:
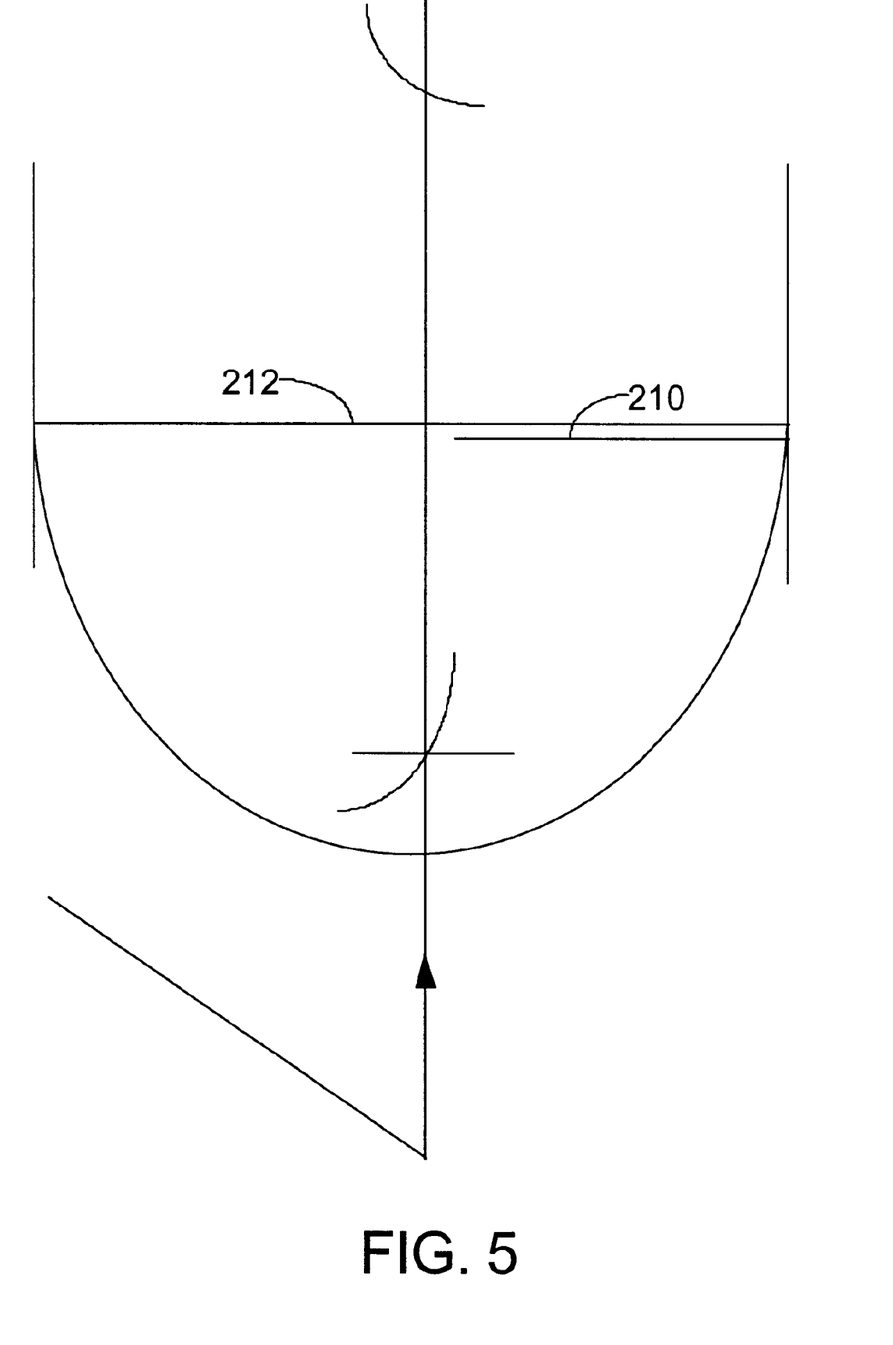
FIG. 5 is a more accurate delineation of the shape indicated in FIG. 4B, for the preferred embodiment of FIGS. 1 and 2.

Mirror assembly 200 is comprised of similar first surface mirrors 210 and 212, one of which is slightly smaller, as shown in FIG. 5. As shown in FIG. 4A, optional lines 250 on mirrors 210 and 212 are parallel to the centerline (passing through C), and, therefore, serve to disguise the true nature of the centerline as the apex of the right angle between the mirrors.

Mirrors 210 and 212 are preferably glued to right angle support 220 which may be made as glued up wood blocks. Right angle support 220 is fitted over shaft 380 of gearbox 300 and secured with pin, such as a roll pin, 230.

Figure 4B:
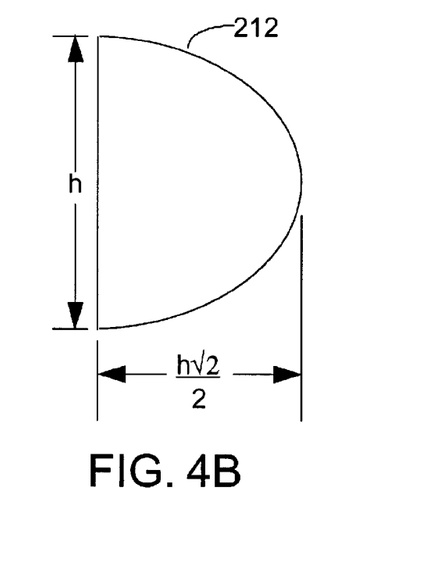
FIG. 4B shows the shape of one of these mirrors.

As shown in FIGS. 4A, 4B, and 5, mirror assembly 200 is fitted to the cylindrical housing 100 by projecting the circular cross section of tube 110 onto mirror assembly 200 to define a half elliptical shape for each mirror 210 or 212. Mirror 210 is slightly smaller than mirror 212 to accommodate the overlap at the 90-degree joint between mirrors.

Shaft 390 of gearbox 300 is tightly fitted to flange 130 and may be further fastened as by staking. In the preferred embodiment, components of gearbox 300 preferably include aluminum support plates, aluminum gears, and shafts of readily machinable steel. Bushings of plastic or oil impregnated bronze support the rotatable components.

Support plates 310 and 312 are spaced from one another by spacers 320 and 330, which are each drilled and tapped at each end, and secured by screws.

Spacer 330 is heavier to cause gearbox 300 to orient itself with spacer 330 at the bottom (as gearbox 300 is essentially free to rotate about shaft 390).

In operation, housing 100 is held so that window 150 is essentially vertical by a user 500 in such a way that the user can see his or her reflection in the mirror. Housing 100 supports gearbox 300 via flange 130 and shaft 390 and mirror assembly 200 via shaft 380. Spacer 330 will hang downward. The beginning orientation of mirror assembly 200 is not significant.

The user 500 rotates housing 100 generally about the axis of tube 110. The orientation of gearbox 300 remains essentially constant so the rotation of housing 100 is transferred through flange 130 and shaft 390 to gear 350 which is firmly fastened, as by staking, to shaft 390.

Gear 350 turns same diameter gear 355 and gear 360 which is pinned to and turns with gear 355. Gear 360 in turn drives gear 370 which is twice its diameter. Gear 370 is firmly fastened, as by press fit, to shaft 380 which thereby causes mirror assembly 200 to rotate at half the rate of housing 100. The reflection will rotate at the same rate and in the same direction as housing 100.

Figures 3, 3A:
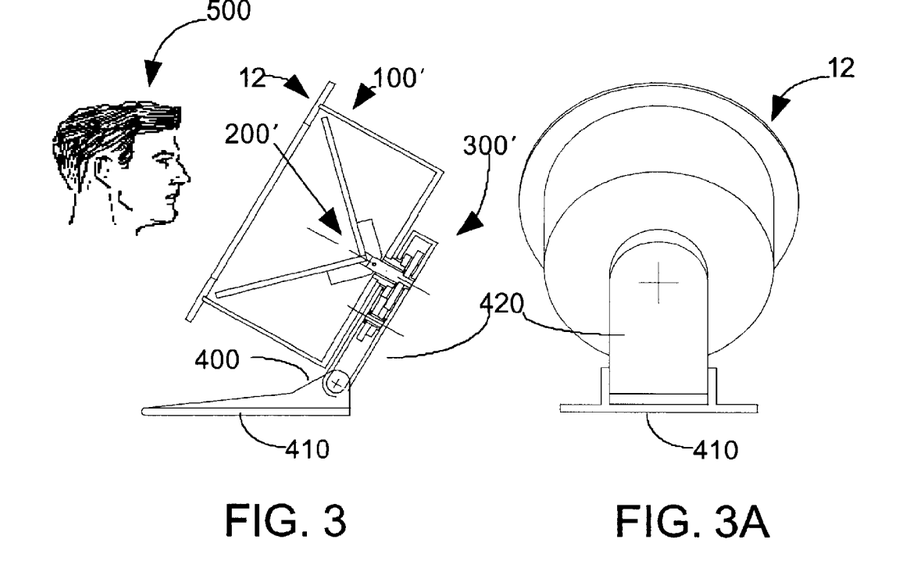
FIG. 3 is a side section through the center of an alternate embodiment of the Invention.
FIG. 3A is a rear elevation of the alternate embodiment.
Figure 3:
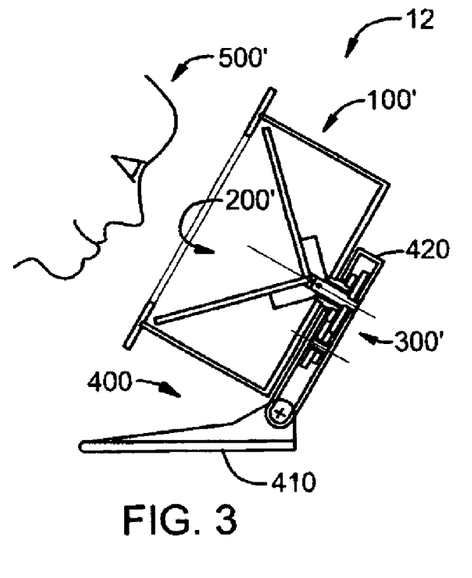
Figure 3A:
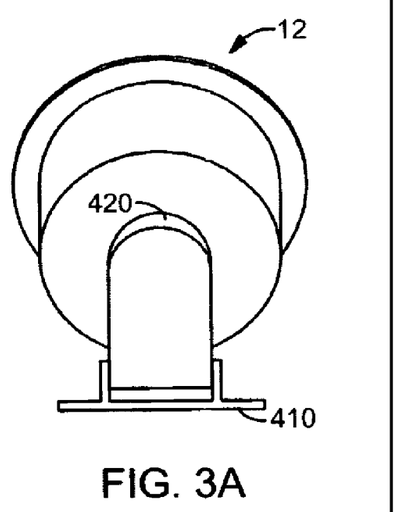
Figure 3B:
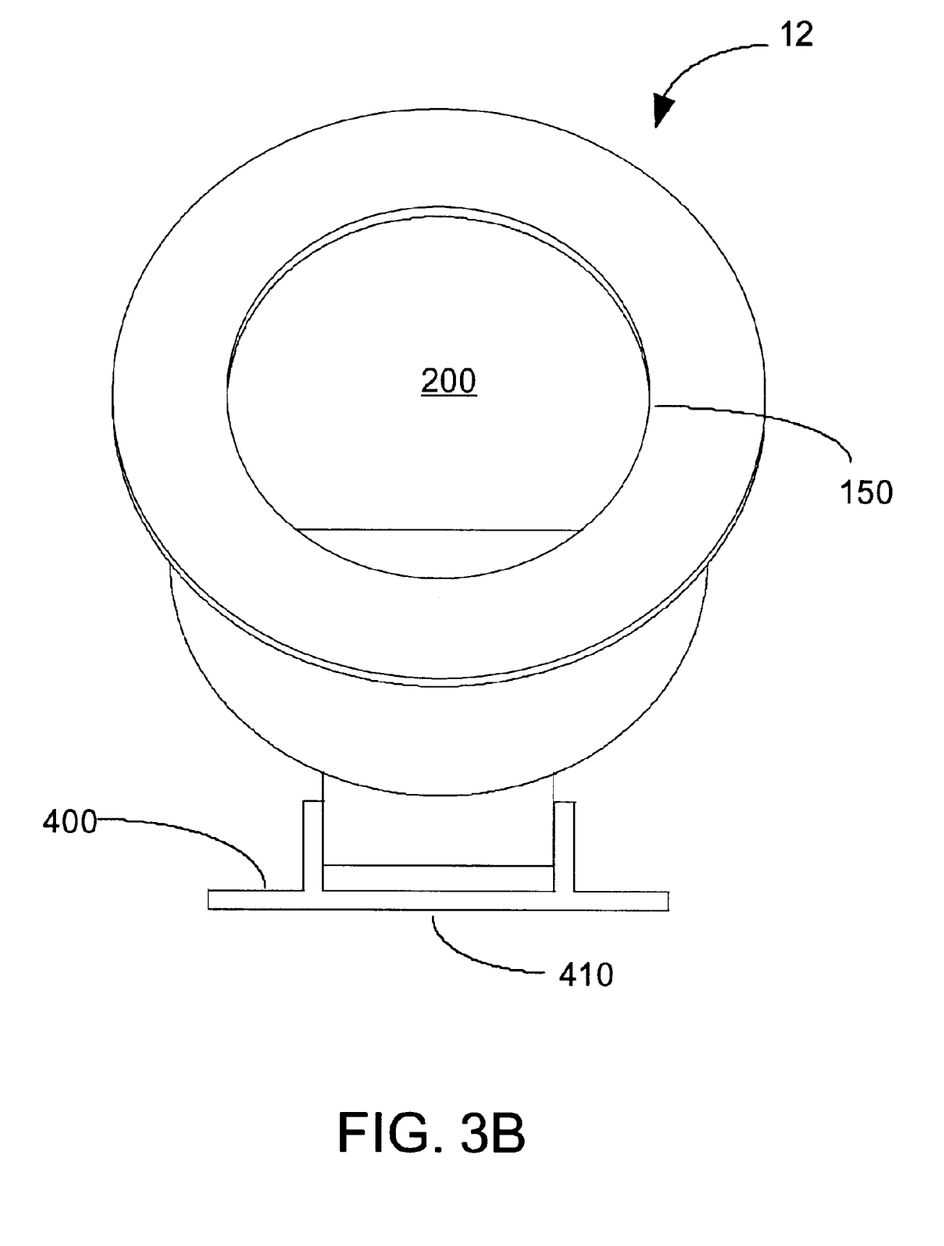
FIG. 3B is a front elevation of the alternate embodiment.

In the alternate embodiment 12 of FIG. 3, housing 100' does not enclose gearbox 300' which is instead mounted in upright 420 which is tiltably mounted to foot 410 of base 400. Gearbox 300' obviously does not require a weight to remain vertical.

It will be apparent to one skilled in the art that many of the details described above are not central to the Invention. Gears may, for example, be replaced by friction wheels or sprockets with chain or belts. The mirrors need not be elliptical nor so closely fit the housing. Gearing may be deleted for an inferior, but still useful, effect. Size is of little consequence.

In general, while the Invention has been described with reference to specific embodiments thereof, it will be appreciated by those of ordinary skill in the art that modifications can be made to the Invention without departing from the spirit and scope thereof.

I claim:

1. A method to produce a rotated image of a viewer thereof, said image being observable to the viewer in real-time, comprising the steps of:
   a) arranging two planar mirror surfaces to form an intersection having an interior the planes defined by the surfaces form an intersection having an interior angle of ninety degrees;
   b) positioning a viewer to face the interior angle and about or near an axis that is perpendicular to the intersection and bisects the interior angle; and,
   c) orienting the intersections to be other than perpendicular to a plane that passes through both eyes of the viewer and also is coincident with the line of sight of the viewer.

2. The method of claim 1, wherein the intersection is parallel to the plane that passes through both eyes of the viewer, whereby the image is inverted.

3. The method of claim 1, further comprising the step of:
   disguising the intersection by forming lines parallel to the intersection at the surface of at least one of the mirrors.

4. A method for rotating a self-image of a viewer, said image being observable to the viewer in real-time, comprising the steps of:

arranging two planar mirror surfaces to form a mirror assembly, the planes defined by the surfaces forming an intersection with an interior angle of ninety degrees;
   positioning a viewer to face the interior angle of the mirror assembly and about or near an axis that is perpendicular to the intersection and bisects the interior angle; and,
   rotating the assembly about the axis.

5. The method of claim 4, further comprising the step of:
   linking, through a linkage, the rotation of the assembly to a rotatable housing, wherein the housing rotates about said axis twice as fast as the assembly.

6. The method of claim 5, further comprising the step of:
   adding a weight to the linkage sufficient to prevent at least a portion of the linkage from rotating.

7. The method of claim 4, further comprising the step of:
   disguising the intersection by forming lines parallel to the intersection at the surface of at least one of the mirrors.

8. The method of claim 4, wherein the step of rotating is done manually by the viewer.

9. An apparatus for rotating an image of a viewer thereof, said image being obeservable to the viewer in real-time, comprising:

two planar mirror surfaces arranged to form a mirror assembly, wherein the planes defined by the surfaces form an intersection with an interior angle of ninety degrees, and wherein the mirror assembly is free to rotate about an axis that is perpendicular to the intersection and bisects the interior angle;
   a rotatable housing linked through a linkage to the mirror assembly that enables rotation of the assembly; and,
   a cover, comprising a window through which a viewer may observe a real-time self-image.

10. The apparatus of claim 9, wherein the cover is free to rotate about said axis at a rate different from that of the mirror assembly.

11. The apparatus of claim 9, wherein the cover comprises a housing generally surrounding the mirror assembly.

12. The apparatus of claim 9, further comprising:
    a linkage that causes the assembly to rotate at half the rate of the cover.

13. The apparatus of claim 12, further comprising:
    a weight sufficient to prevent at least a portion of the linkage from rotating.

14. The apparatus of claim 9, wherein the perimeters of the mirror are at least partially elliptical.

15. The apparatus of claim 9, wherein the plane of rotation is generally perpendicular to the plane that passes through both eyes of the viewer and is coincident with the line of the viewer.

* * * * *

UNITED STATES PATENT AND TRADEMARK OFFICE
CERTIFICATE OF CORRECTION

PATENT NO.     : 6,786,612 B2
DATED          : September 7, 2004
INVENTOR(S)    : Weinreich It is certified that error appears in the above-identified patent and that said Letters Patent is hereby corrected as shown below:

Title page showing a drawing figure should be deleted and substitute therefor a title page illustrating a figure as shown on the attached sheet.

Delete drawing sheets 1-5 and substitute therefore drawing sheeets 1-5 attached.

Signed and Sealed this

Seventh Day of December, 2004

JON W. DUDAS
*Director of the United States Patent and Trademark Office*

(12) United States Patent
Weinreich (10) Patent No.: US 6,786,612 B2
(45) Date of Patent: Sep. 7, 2004

(54) TURNING MIRROR

(76) Inventor: Stephen Weinreich, 14 Norton Rd., Monmouth Junction, NJ (US) 08852

(*) Notice: Subject to any disclaimer, the term of this patent is extended or adjusted under 35 U.S.C. 154(b) by 0 days.

(21) Appl. No.: 10/707,436

(22) Filed: Dec. 13, 2003

(65) Prior Publication Data

US 2004/0109246 A1 Jun. 10, 2004

Related U.S. Application Data

(62) Division of application No. 09/360,267, filed on Jul. 26, 1999, now abandoned.
(60) Provisional application No. 60/100,717, filed on Sep. 17, 1998.

(51) Int. Cl.[7] .................................................. G02B 7/182
(52) U.S. Cl. ............................ 359/871; 359/872; 359/879
(58) Field of Search .................................. 359/871–872, 359/879, 855–856, 220; 248/309.1; 358/248

(56) References Cited

U.S. PATENT DOCUMENTS

| 1,334,810 A | 3/1920 | Smith ........................ 359/855 |
| 3,449,035 A | 6/1969 | Denaro |
| 4,154,507 A | 5/1979 | Bari ........................... 359/220 |
| 4,187,001 A | 2/1980 | Redwitz et al. ............ 359/872 |
| 5,173,781 A | 12/1992 | Masreliez .................... 358/248 |
| 5,392,521 A | 2/1995 | Allen ............................ 33/293 |
| 5,589,991 A | 12/1996 | Bieier ........................ 359/856 |

*Primary Examiner*—Mohammad Sikder
(74) *Attorney, Agent, or Firm*—Stanley H. Kremen (57) ABSTRACT

A mirror which the viewer's reflection rotates clockwise or counterclockwise along with the rotation of the mirror.

15 Claims, 5 Drawing Sheets